United States Patent
Jeon et al.

(10) Patent No.: US 8,965,644 B2
(45) Date of Patent: Feb. 24, 2015

(54) SYSTEM AND METHOD OF CONTROLLING SHIFTING FOR VEHICLE

(71) Applicants: Hyundai Motor Company, Seoul (KR); Kia Motors Corporation, Seoul (KR)

(72) Inventors: Byeong Wook Jeon, Seoul (KR); Heeyong Lee, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/091,067

(22) Filed: Nov. 26, 2013

(65) Prior Publication Data

US 2014/0297140 A1 Oct. 2, 2014

(30) Foreign Application Priority Data

Mar. 26, 2013 (KR) .................. 10-2013-0032177

(51) Int. Cl.
*G06F 7/00* (2006.01)
*F16H 61/68* (2006.01)

(52) U.S. Cl.
CPC ............ *F16H 61/68* (2013.01); *F16H 2306/30* (2013.01)
USPC .................................. 701/57; 701/59; 701/65

(58) Field of Classification Search
CPC ............... F16H 2061/0081; F16H 2061/0087; F16H 2061/009; F16H 2061/0093; B60W 30/08; B60W 30/09; B60W 30/16; B60W 30/182; B60W 40/09; B60W 40/107; B60W 2050/0029; B60W 2540/30; B60W 2550/142; B60W 2550/143; B60W 2550/146
See application file for complete search history.

(56) References Cited

U.S. PATENT DOCUMENTS

| | | | |
|---|---|---|---|
| 8,521,338 B2 * | 8/2013 | Takeuchi et al. ................... | 701/1 |
| 2008/0167820 A1 * | 7/2008 | Oguchi et al. ................ | 701/301 |
| 2011/0118929 A1 * | 5/2011 | Takae et al. ..................... | 701/29 |
| 2011/0172864 A1 * | 7/2011 | Syed et al. ....................... | 701/22 |
| 2012/0245758 A1 * | 9/2012 | Mizuta et al. ...................... | 701/1 |
| 2014/0277972 A1 * | 9/2014 | Jeon et al. ........................ | 701/51 |

FOREIGN PATENT DOCUMENTS

| | | |
|---|---|---|
| JP | 09184567 | 7/1997 |
| JP | 2005-106171 A | 4/2005 |
| JP | 2007-146998 A | 6/2007 |
| JP | 4330952 B2 | 9/2009 |
| KR | 10-1013956 B1 | 2/2011 |

* cited by examiner

*Primary Examiner* — David D Le
(74) *Attorney, Agent, or Firm* — McDermott Will & Emery LLP

(57) ABSTRACT

A system and a method of controlling shifting for a vehicle includes a data detector detecting data for a shift control, a road condition determiner determining a road condition based on the data, a short term driving tendency determiner determining a short term driving tendency of a driver based on the data, and a long term driving tendency determiner determining a long term driving tendency of the driver based on the short term driving tendency of the driver. An optimal driving mode determiner determines an optimal driving mode based on the road condition, the short term driving tendency of the driver, and the long term driving tendency of the driver, wherein the system controls shifting according to the optimal driving mode determined by the optimal driving mode determiner.

19 Claims, 3 Drawing Sheets

SYSTEM AND METHOD OF CONTROLLING SHIFTING FOR VEHICLE

CROSS-REFERENCE TO RELATED APPLICATION

This application claims the benefit of priority to Korean Patent Application No. 10-2013-0032177 filed in the Korean Intellectual Property Office on Mar. 26, 2013, the entire contents of which are incorporated herein by reference.

TECHNICAL FIELD

The present disclosure relates to a system and a method of controlling shifting for a vehicle. More particularly, the present disclosure relates to a system and a method of controlling shifting for a vehicle which controls the shift according to a driver's intention by considering a long term driving tendency of the driver, a short term driving tendency of the driver, and road condition.

BACKGROUND

Customer satisfaction of the driving performance of a vehicle depends on how precisely the vehicle runs in accordance with the driving tendency of the driver. Driving tendencies may vary, and vehicle performance characteristics are specified according to the vehicle model. Therefore, the driving performance of a vehicle may not be satisfactory to the driver. Accordingly, the vehicle may not achieve high customer satisfaction. If the shifting of the vehicle coincides with the driving tendency of the driver, customer satisfaction may be maximized.

Methods of recognizing the driving tendency and controlling shifting according to the driver's tendency have been developed. The method of controlling shifting according to the recognized driving tendency assumes that the driving tendency is constant. The driving tendency of the driver, however, may continuously vary according to the driver's emotions, road condition, and so on. Therefore, the recognized driving tendency may differ greatly from an actual driving tendency of the driver at one point. If the shifting is controlled according to the recognized driving tendency, the actual driving intention of the driver may not be reflected in the shift, and the driver may be dissatisfied with the driving performance.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a system and a method of controlling shifting for a vehicle having advantages of reflecting a driver's intention on the shift by considering driving tendencies of the driver, such as a short term driving tendency of the driver (e.g., for current driving or for a predetermined time in the current driving), a long term driving tendency of the driver (e.g., from purchase of the vehicle to the present), and road conditions.

A system of controlling shifting for a vehicle according to an aspect of the present disclosure may include a data detector detecting data for a shifting control, a road condition determiner determining a road condition based on the data, a short term driving tendency determiner determining a short term driving tendency of a driver based on the data, and a long term driving tendency determiner determining a long term driving tendency of the driver based on the short term driving tendency of the driver. An optimal driving mode determiner determines an optimal driving mode based on the road condition, the short term driving tendency of the driver, and the long term driving tendency of the driver. The system controls shifting according to the optimal driving mode determined by the optimal driving mode determiner.

The road condition determiner may include a road state determiner determining a road state of a snowy road or a slippery road, a road shape determiner determining a road shape of a curved road or an inclined road, and a road congestion determiner determining a degree of congestion the road.

In an exemplary embodiment, the optimal driving mode determiner may determine in order the road condition, the short term driving tendency of the driver, and the long term driving tendency of the driver.

In another exemplary embodiment, the optimal driving mode determiner may give top priority to the road condition and a same level of priority to the short term driving tendency of the driver, and the long term driving tendency of the driver simultaneously.

In another exemplary embodiment, the optimal driving mode determiner may control shifting according to the long term driving tendency of the driver. The optimal driving mode determiner determines a driving mode according to a specific road state as the optimal driving mode if the road state is the specific road state.

In another exemplary embodiment, the optimal driving mode determiner may control shifting according to the long term driving tendency of the driver. The optimal driving mode determiner determines a driving mode according to a specific road shape as the optimal driving mode if the road shape is the specific road shape.

In another exemplary embodiment, the optimal driving mode determiner may control shifting according to the long term driving tendency of the driver. The optimal driving mode determiner determines a driving mode according to a congested road as the optimal driving mode if the road is congested.

In another exemplary embodiment, the optimal driving mode determiner may control shifting according to the long term driving tendency of the driver. The optimal driving mode determiner determines a driving mode according to the short term driving tendency of the driver as the optimal driving mode if the road condition determiner does not detect a specific road condition, and a difference between the short term driving tendency of the driver and the long term driving tendency of the driver is larger than a predetermined value.

In another exemplary embodiment, the optimal driving mode determiner may control shifting according to the long term driving tendency of the driver. The optimal driving mode determiner determines the optimal driving mode considering a short term driving tendency factor of the driver and a long term driving tendency factor of the driver if the road condition determiner does not detect a specific road condition.

In another exemplary embodiment, the shifting control may include a change of a shift pattern, a change of engaging feeling to a target shift-speed, a change of an engine torque map, and a change of an engine torque filter.

A method of controlling shifting for a vehicle according to another aspect of the present disclosure may include detecting data for a shifting control, determining whether a road state is a specific road state based on the data. If the road state is not the specific road state, determining whether a road shape is a specific road shape based on the data. If the road shape is not the specific road shape, determining whether the road is congested based on the data. If the road is not congested, determining whether a difference between a short term driving tendency and a long term driving tendency of a driver is larger than a predetermined value. Shifting is controlled according to the long term driving tendency of the driver if the difference between the short term driving tendency and the long term driving tendency of the driver is not larger than the predetermined value.

In another exemplary embodiment, the method may further include determining a driving mode according to the specific road state if the road state is the specific road state, and controlling shifting according to the determined driving mode.

In another exemplary embodiment, the method may further include determining a driving mode according to the specific road shape if the road shape is the specific road shape, and controlling shifting according to the determined driving mode.

In another exemplary embodiment, the method may further include determining a driving mode according to the congested road if the road is congested, and controlling shifting according to the determined driving mode.

In another exemplary embodiment, the method may further include determining a driving mode according to the short term driving tendency of the driver if the difference between the short term driving tendency and the long term driving tendency of the driver is larger than a predetermined value, and controlling shifting according to the determined driving mode.

A method of controlling shifting for a vehicle according to another aspect of the present disclosure may include detecting data for a shifting control, and determining whether a road state is a specific road state based on the data. If the road state is not the specific road state, determining whether a road shape is a specific road shape based on the data. If the road shape is not the specific road shape, determining whether the road is congested based on the data. If the road is not congested, calculating a short term driving tendency factor and a long term driving tendency factor of the driver based on the data. A driving mode considering the short term driving tendency factor and the long term driving tendency factor of the driver is determined and shifting is controlled according to the determined driving mode.

In another exemplary embodiment, the method may further include determining the driving mode according to the specific road state if the road state is the specific road state, and controlling shifting according to the determined driving mode.

In another exemplary embodiment, the method may further include determining the driving mode according to the specific road shape if the road shape is the specific road shape, and controlling shifting according to the determined driving mode.

In another exemplary embodiment, the method may further include determining the driving mode according to the congested road if the road is congested, and controlling shifting according to the determined driving mode.

DETAILED DESCRIPTION

An exemplary embodiment of the present disclosure will hereinafter be described in detail with reference to the accompanying drawings.

Figure 1:
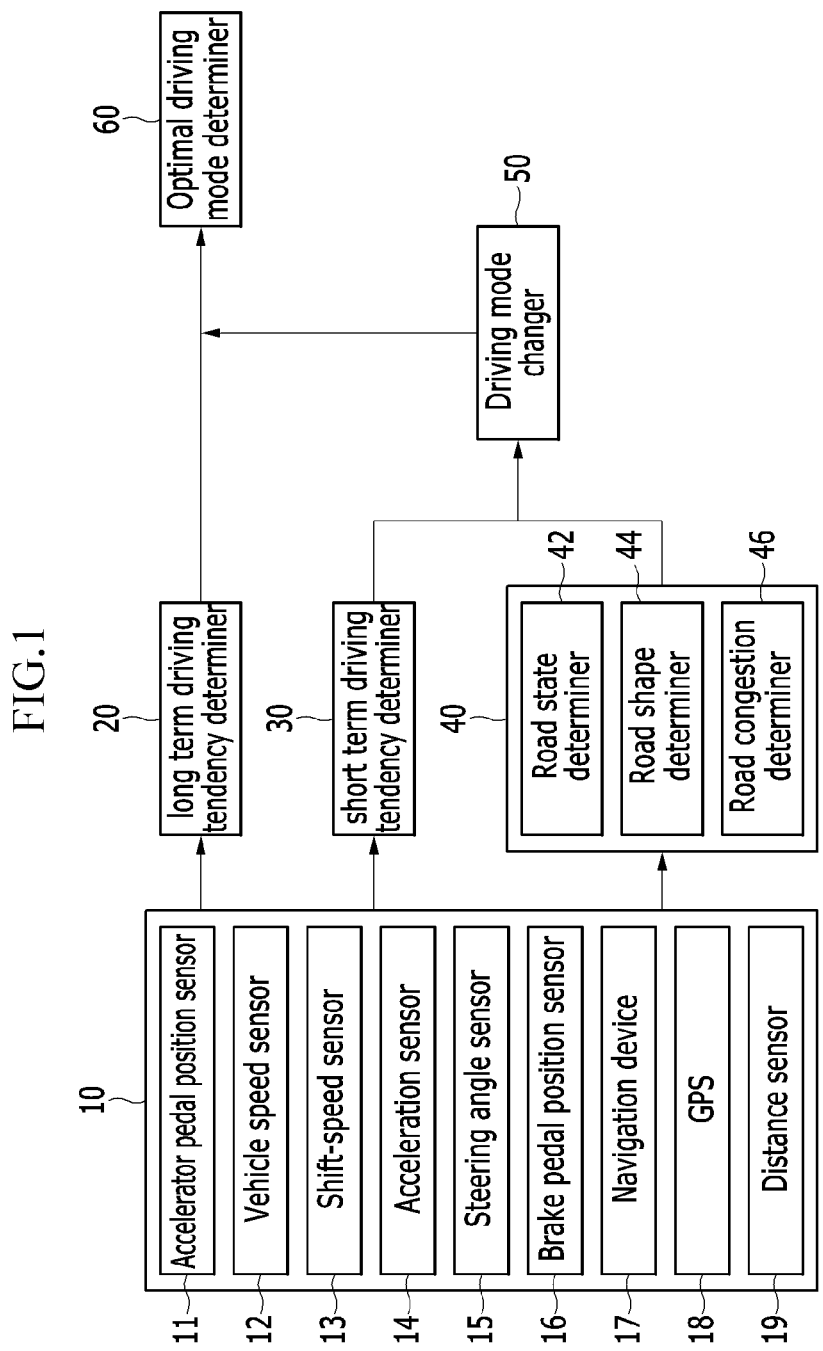
FIG. 1 is a block diagram of a system of controlling shifting for a vehicle according to an exemplary embodiment of the present disclosure.

FIG. 1 is a block diagram of a system of controlling shifting for a vehicle according to an exemplary embodiment of the present disclosure.

As shown in FIG. 1, a system of controlling shifting for a vehicle according to an exemplary embodiment of the present disclosure includes a data detector 10, a long term driving tendency determiner 20, a short term driving tendency determiner 30, a road condition determiner 40, a driving mode changer 50, and an optimal driving mode determiner 60.

The data detector 10 detects data for shifting control. The data detected by the data detector 10 is transmitted to the long term driving tendency determiner 20, the short term driving tendency determiner 30, and the road condition determiner 40. The data detector 10 includes an accelerator pedal position sensor 11, a vehicle speed sensor 12, a shift-speed sensor 13, an acceleration sensor 14, a steering angle sensor 15, a brake pedal position sensor 16, a navigator 17, a global positioning system (GPS) 18, and a distance sensor 19.

The accelerator pedal position sensor 11 detects a degree of which a driver pushes an accelerator pedal. That is, the accelerator pedal position sensor 11 detects the data related to the driver's acceleration.

The vehicle speed sensor 12, mounted at a wheel of the vehicle, detects a vehicle speed. Alternatively, the vehicle speed may be calculated based on a GPS signal received by the GPS 18.

A target shift-speed may be calculated by using a shift pattern based on the signal from the accelerator pedal position sensor 11 and the signal from the vehicle speed sensor 12. Shifting to the target shift-speed is controlled by hydraulic pressure supplied to a plurality of friction elements or released from the plurality of friction elements in an automatic transmission provided with a plurality of planetary gear sets and the plurality of friction elements. In addition, current applied to a plurality of synchronizer devices and actuators is controlled in a double clutch transmission.

The shift-speed sensor 13 detects a shift-speed that is currently engaged.

The acceleration sensor 14 detects an acceleration of the vehicle. The acceleration sensor 14 may be mounted in addition to the vehicle speed sensor 12 and may directly detect the acceleration of the vehicle, or the acceleration sensor 14 may calculate the acceleration of the vehicle by differentiating the vehicle speed detected by the vehicle speed sensor 12.

The steering angle sensor 15 detects a steering angle of the vehicle. That is, the steering angle sensor 15 detects a direction to which the vehicle drives.

The brake pedal position sensor 16 detects whether a brake pedal is pressed or not. That is, the brake pedal position sensor 16 as well as the accelerator pedal position sensor 11 detects the driver's acceleration intention.

The navigator 17 guides a route to a destination. The navigator 17 includes an input/output regulator inputting or outputting information for guidance of the route and a current position detector detects information on a current position of the vehicle. A memory stores map data for calculating the route and data for guiding the route, and a controller searches the route and guides the route.

The GPS 18 receives a signal transmitted from a GPS satellite and transmits a signal corresponding thereto to the navigator 17.

The distance sensor 19 detects a distance between the vehicle of the driver and a preceding vehicle. Various sensors, such as an ultrasonic wave sensor and an infrared sensor, may be used as the distance sensor 19.

The long term driving tendency determiner 20 determines a long term driving tendency of the driver over comparatively long time based on the data detected by the data detector 10. The long term driving tendency determiner 20 determines the driving tendency of the driver, for example, from the time of purchasing the vehicle to the present. The long term driving tendency of the driver determined by the long term driving tendency determiner 20 is calculated as a long term driving tendency factor, and the long term driving tendency factor is transmitted to the optimal driving mode determiner 60. The long term driving tendency determiner 20 has one or more microprocessors which may be operated by a program for determining the long term driving tendency of the driver.

The short term driving tendency determiner 30 determines a short term driving tendency of the driver that is a driving tendency for a comparatively short time based on the data detected by the data detector 10. The short term driving tendency determiner 30 determines the driving tendency of the driver, for example, during current driving or for a predetermined time period in the current driving. The short term driving tendency of the driver may be determined based on how well one or more assumptions related to the driving tendency of the driver are satisfied. Fuzzy control theory may be used to determine the short term driving tendency of the driver. The short term driving tendency of the driver determined by the short term driving tendency determiner 30 is calculated as a short term driving tendency factor, and the short term driving tendency factor is transmitted to the driving mode changer 50 and the long term driving tendency determiner 20. The short term driving tendency determiner 30 has one or more microprocessors which may be operated by a program for determining the short term driving tendency of the driver.

The short term driving tendency factor calculated by the short term driving tendency determiner 30 is used to determine the long term driving tendency of driver at the long term driving tendency determiner 20. That is, the long term driving tendency determiner 20 calculates the long term driving tendency factor of the driver by averaging a plurality of short term driving tendency factors.

The road condition determiner 40 determines a condition of a road on which the vehicle is running based on the data detected by the data detector 10. The road condition determiner 40 includes a road state determiner 42, a road shape determiner 44, and a road congestion determiner 46.

The road state determiner 42 detects a specific road state, such as an icy road, a snowy road, a slippery road, and an unpaved road. The icy road or the slippery road is detected based on whether wheel slip occurs, and the unpaved road is detected based on a vertical vibration level transmitted from the road.

The road shape determiner 44 detects a specific road shape such as a curved road and an inclined road. The specific road shape such as the curved road and the inclined road may be detected based on the current position of the vehicle and the map data stored in the navigator 17.

The road congestion determiner 46 detects a congestion degree of the road. The congestion degree of the road may be detected from traffic information or by using the distance sensor 19.

The road condition determined by the road condition determiner 40 is transmitted to the driving mode changer 50. The road condition determiner 40 has one or more microprocessors which may be operated by a program for determining the road condition.

The driving mode changer 50 determines whether it is necessary to change a driving mode based on the short term driving tendency factor of the driver transmitted from the short term driving tendency determiner 30 and the road condition transmitted from the road condition determiner 40. The driving mode is changed when the specific road condition is detected, or the short term driving tendency factor changes quickly. If it is determined that change of the driving mode is necessary, the driving mode changer 50 transmits a determination result to the optimal driving mode determiner 60. If it is determined that changed of the driving mode is not necessary, the driving mode changer 50 may transmit only the short term driving tendency factor to the optimal driving mode determiner 60. The driving mode changer 50 has one or more microprocessors which may be operated by a program for determining whether the driving mode change is necessary.

The optimal driving mode determiner 60 determines an optimal driving mode based on the long term driving tendency factor of the driver, the determination result of the driving mode changer 50, and the short term driving tendency factor of the driver, and controls shifting according to the determined optimal driving mode. The optimal driving mode determiner 60 has one or more microprocessors which may be operated by a predetermined program for determining the optimal driving mode and controlling shifting according to the optimal driving mode.

The optimal driving mode determiner 60 controls shifting according to the long term driving tendency factor of the driver. If the specific road condition is detected, however, the optimal driving mode determiner 60 may determine the driving mode according to the specific road condition as the optimal driving mode.

If the specific road condition is not detected, but a difference between the long term driving tendency factor and the short term driving tendency factor is larger than a predetermined value, the optimal driving mode determiner 60 determines the driving mode according to the short term driving tendency factor as the optimal driving mode. On the contrary, the optimal driving mode determiner 60 may determine the optimal driving mode considering both of the short term driving tendency factor and the long term driving tendency factor.

The optimal driving mode determiner 60 may change a shift pattern, engaging feeling to the target shift-speed, an engine torque map, and/or an engine torque filter according to the determined driving mode.

The data detector 10, the long term driving tendency determiner 20, the short term driving tendency determiner 30, the road condition determiner 40, the driving mode changer 50, and the optimal driving mode determiner 60 may be provided in one CPU.

Hereinafter, a method of controlling shifting for a vehicle according to an exemplary embodiment of the present disclosure will be described in detail with reference to the accompanying drawings.

Figure 2:
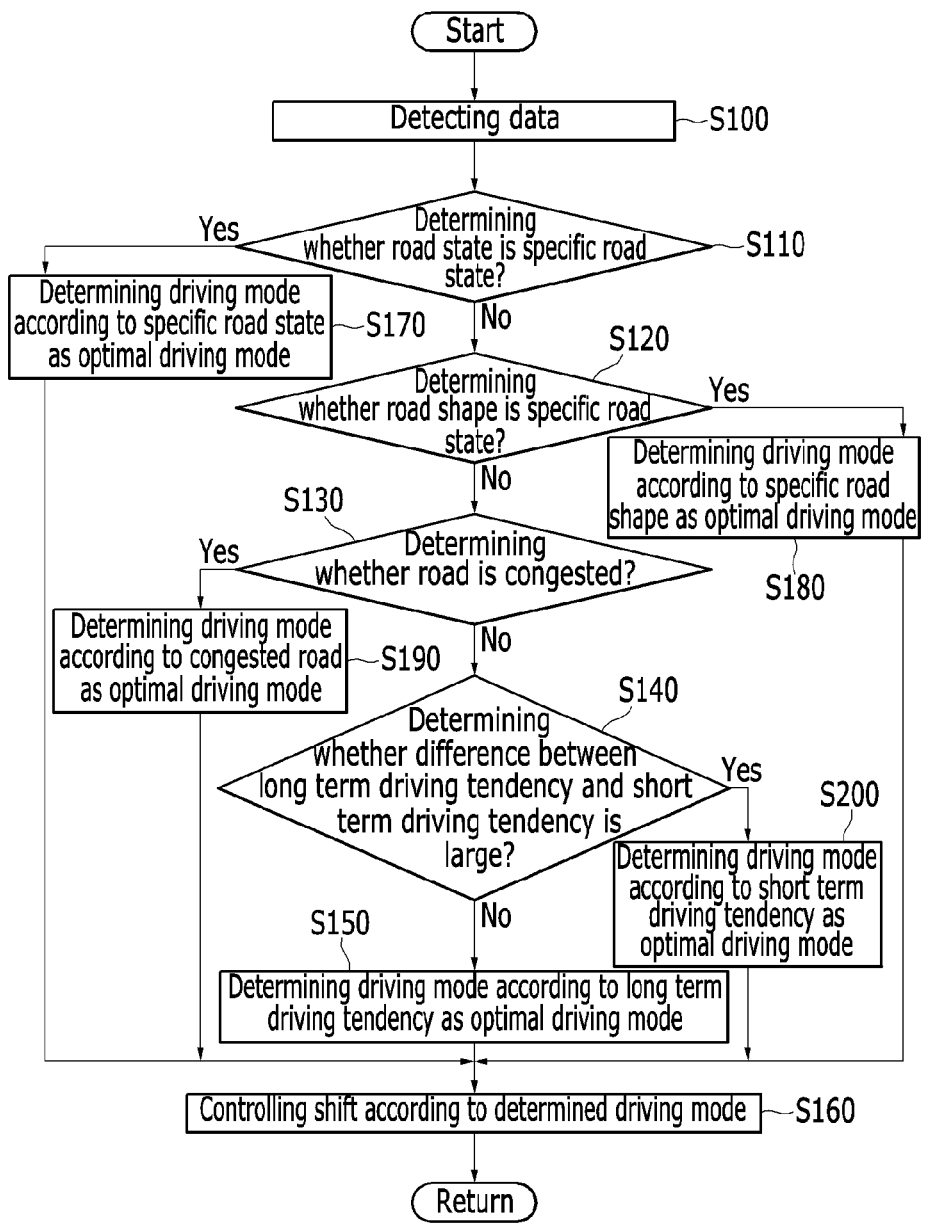
FIG. 2 is a flowchart of a method of controlling shifting for a vehicle according to an exemplary embodiment of the present disclosure.

FIG. 2 is a flowchart of a method of controlling shifting for a vehicle according to an exemplary embodiment of the present disclosure.

The method of controlling shifting for the vehicle according to an exemplary embodiment of the present disclosure begins with detecting the data at step S100.

If the data detector 10 detects the data for shifting control, the road state determiner 40 determines whether the road state is the specific road state at step S110. Here, it is determined whether the state of the road on which the vehicle currently runs is the specific road state, such as an icy road, slippery road, snowy road, rough road, or unpaved road.

If the road state is the specific road state at step S110, the driving mode changer 50 informs the optimal driving mode determiner 60 that changing the driving mode is necessary. The optimal driving mode determiner 60 determines the driving mode according to the specific road state as the optimal driving mode at step S170 and controls shifting according to the determined optimal driving mode at step S160. For example, the shift pattern is changed to a holding mode, shift feel is controlled to be smooth, and an engine torque map and an engine torque filter are changed to improve fuel economy on an icy road or slippery road.

If the road state is not the specific road state at step S110, the road shape determiner 44 determines whether the road shape is the specific road shape at step S120. Here, it is determined whether the shape of the road on which the vehicle runs in the near future is the specific road shape, such as a curved road, a downhill road, or an uphill road.

If the road shape is the specific road shape at step S120, the driving mode changer 50 informs the optimal driving mode determiner 60 that changing the driving mode is necessary. The optimal driving mode determiner 60 determines the driving mode according to the specific road shape as the optimal driving mode at step S180 and controls shifting according to the determined optimal driving mode at step S160. For example, a lift foot up (LFU) shift may be controlled on the curved road, and the vehicle runs at a low shift-speed on the downhill road.

If the road shape is not the specific road shape at step S120, the road congestion determiner 46 determines whether the road is congested at step S130.

If it is determined that the road is congested at step S130, the driving mode changer 50 informs the optimal driving mode determiner 60 that changing the driving mode is necessary. The optimal driving mode determiner 60 determines the driving mode according to the congested road as the optimal driving mode at step S190 and controls shifting according to the determined optimal driving mode at step S160. For example, the vehicle starts with the second forward speed, shift feel is controlled to be smooth, and the engine torque map and the engine torque filter are changed to improve fuel economy when the road is congested.

If it is determined that the road is not congested at step S130, the optimal driving mode determiner 60 determines whether a difference between the long term driving tendency and the short term driving tendency is large at step S140. That is, a difference between the long term driving tendency factor and the short term driving tendency factor is larger than or equal to a predetermined value.

If it is determined that the difference between the long term driving tendency and the short term driving tendency is large at step S140, the optimal driving mode determiner 60 determines the driving mode according to the short term driving tendency of the driver as the optimal driving mode at step S200 and controls shifting according to the determined optimal driving mode at step S160. For example, kick down-shift is facilitated, shift feel is controlled to be sporty, and the engine torque map and the engine torque filter are changed for the vehicle to be easily accelerated if the driver having a mild long term driving tendency (i.e., does not quickly increase speed or does not stop abruptly) quickly increases the speed.

If it is determined that the difference between the long term driving tendency and the short term driving tendency is not large at step S140, the optimal driving mode determiner 60 determines the driving mode according to the long term driving tendency as the optimal driving mode at step S150 and controls shifting according to the determined optimal driving mode at step S160.

Figure 3:
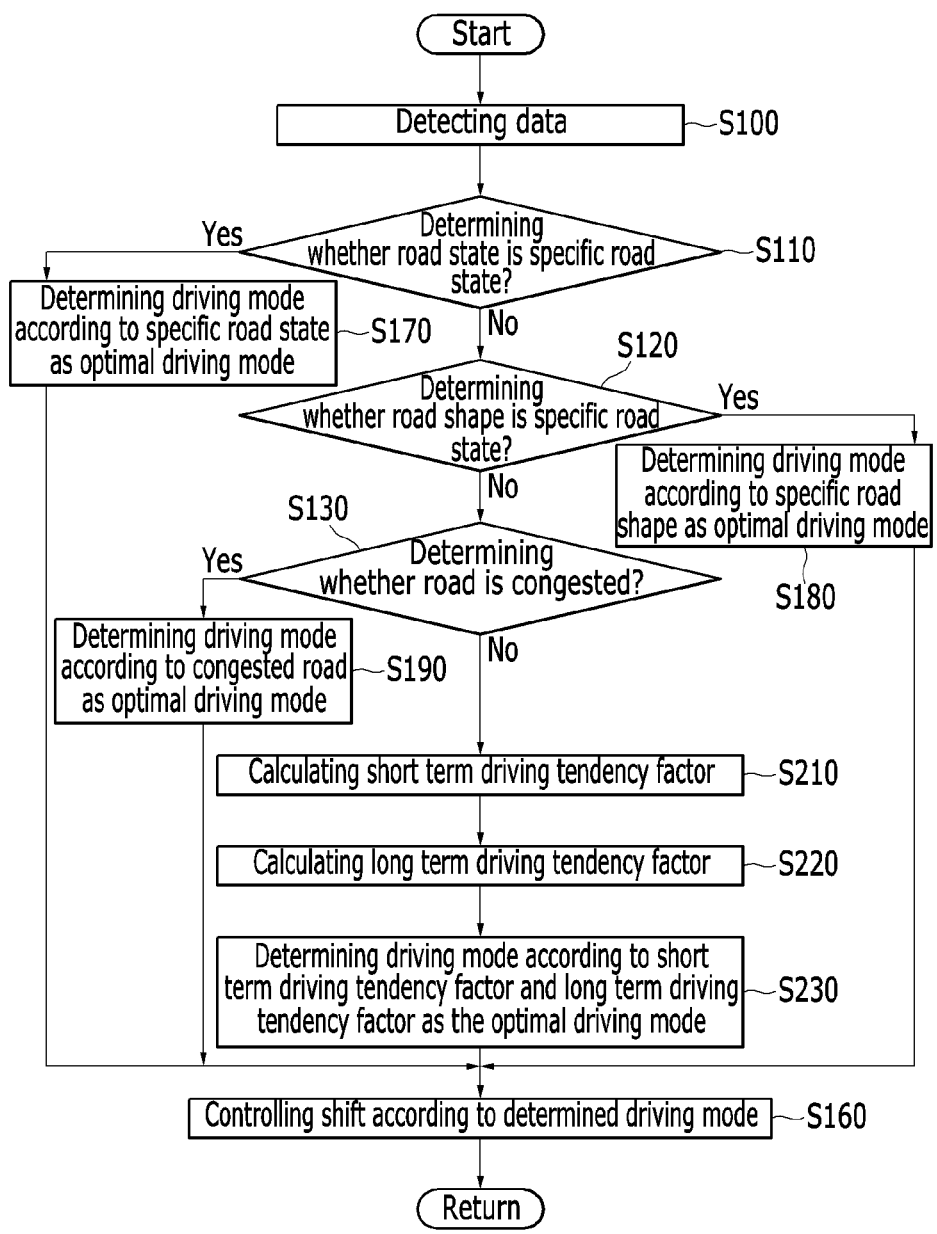
FIG. 3 is a flowchart of a method of controlling shifting for a vehicle according to another exemplary embodiment of the present disclosure.

FIG. 3 is a flowchart of a method of controlling shifting for a vehicle according to another exemplary embodiment of the present disclosure.

A method of controlling shifting for the vehicle according to another exemplary embodiment of the present disclosure is similar to that according to an exemplary embodiment of the present disclosure. Therefore, differences between exemplary embodiments will be described in detail.

Initially, the data detector 10 detects the data for the shifting control at step S100. After that, the road state determiner 40 determines whether the road state is the specific road state at step S110. If the road state is the specific road state at step S110, the optimal driving mode determiner 60 determines the driving mode according to the specific road state as the optimal driving mode at step S170 and controls shifting according to the determined optimal driving mode at step S160.

If the road state is not the specific road state at step S110, the road shape determiner 44 determines whether the road shape is the specific road shape at step S120. If the road shape is the specific road shape at step S120, the optimal driving mode determiner 60 determines the driving mode according to the specific road shape as the optimal driving mode at step S180 and controls shifting according to the determined optimal driving mode at step S160.

If the road shape is not the specific road shape at step S120, the road congestion determiner 46 determines whether the road is congested at step S130. If it is determined that the road is congested at step S130, the optimal driving mode determiner 60 determines the driving mode according to the congested road as the optimal driving mode at step S190 and controls shifting according to the determined optimal driving mode at step S160.

If it is determined that the road is not congested at step S130, the short term driving tendency determiner 30 calculates the short term driving tendency factor at step S210, and the long term driving tendency determiner 20 calculates the long term driving tendency factor at step S220.

Then, the optimal driving mode determiner 60 determines the driving mode according to the short term driving tendency factor and the long term driving tendency factor as the optimal driving mode at step S230 and controls shifting according to the determined optimal driving mode at step S160. After the short term driving tendency factor is multiplied by a short term weight value, and the long term driving tendency factor is multiplied by a long term weight value, the short term driving tendency factor and the long term driving tendency factor may be added up to calculate one driving tendency factor, and the shift may be controlled according to the one driving tendency factor.

As described above, the driver's intention may be precisely reflected on the shift by considering the long term driving tendency and short term driving tendency of the driver and the road condition according to exemplary embodiments of the present disclosure.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system of controlling shifting for a vehicle comprising:
   a data detector detecting data for a shifting control;
   a road condition determiner determining a road condition based on the data;
   a short term driving tendency determiner determining a short term driving tendency of a driver based on the data;
   a long term driving tendency determiner determining a long term driving tendency of the driver based on the short term driving tendency of the driver; and
   an optimal driving mode determiner determining an optimal driving mode based on the road condition, the short term driving tendency of the driver, and the long term driving tendency of the driver,
   wherein the system controls shifting according to the optimal driving mode determined by the optimal driving mode determiner.

2. The system of claim 1, wherein the road condition determiner comprises:
   a road state determiner determining a road state of a snowy road or a slippery road;
   a road shape determiner determining a road shape of a curved road or an inclined road; and
   a road congestion determiner determining a degree of congestion the road.

3. The system of claim 1, wherein the optimal driving mode determiner determines in order the short term driving tendency of the driver, and the long term driving tendency of the driver.

4. The system of claim 1, wherein the optimal driving mode determiner gives top priority to the road condition and gives the same level of priority to the short term driving tendency of the driver and the long term driving tendency of the driver.

5. The system of claim 2, wherein the optimal driving mode determiner controls shifting according to the long term driving tendency of the driver, and
   wherein the optimal driving mode determiner determines a driving mode according to a specific road state as the optimal driving mode if the road state is the specific road state.

6. The system of claim 2, wherein the optimal driving mode determiner controls shifting according to the long term driving tendency of the driver, and
   wherein the optimal driving mode determiner determines a driving mode according to a specific road shape as the optimal driving mode if the road shape is the specific road shape.

7. The system of claim 2, wherein the optimal driving mode determiner controls shifting according to the long term driving tendency of the driver, and
   wherein the optimal driving mode determiner determines a driving mode according to a congested road as the optimal driving mode if the road is congested.

8. The system of claim 1, wherein the optimal driving mode determiner controls shifting according to the long term driving tendency of the driver, and
   wherein the optimal driving mode determiner determines a driving mode according to the short term driving tendency of the driver as the optimal driving mode if the road condition determiner does not detect a specific road condition, and a difference between the short term driving tendency of the driver and the long term driving tendency of the driver is larger than a predetermined value.

9. The system of claim 1, wherein the optimal driving mode determiner controls shifting according to the long term driving tendency of the driver, and
   wherein the optimal driving mode determiner determines the optimal driving mode by considering a short term driving tendency factor of the driver and a long term driving tendency factor of the driver if the road condition determiner does not detect a specific road condition.

10. The system of claim 1, wherein the shifting control comprises a change of a shift pattern, a change of engaging feeling to a target shift-speed, a change of an engine torque map, and a change of an engine torque filter.

11. A method of controlling shifting for a vehicle comprising:
    detecting data for a shifting control;
    determining whether a road state is a specific road state based on the data;
    determining, if the road state is not the specific road state, whether a road shape is a specific road shape based on the data;
    determining, if the road shape is not the specific road shape, whether the road is congested based on the data;
    determining, if the road is not congested, whether a difference between a short term driving tendency and a long term driving tendency of a driver is larger than a predetermined value; and
    controlling shifting according to the long term driving tendency of the driver if the difference between the short term driving tendency and the long term driving tendency of the driver is not larger than the predetermined value.

12. The method of claim 11, further comprising:
    determining a driving mode according to the specific road state if the road state is the specific road state; and
    controlling shifting according to the determined driving mode.

13. The method of claim 11, further comprising:
    determining a driving mode according to the specific road shape if the road shape is the specific road shape; and
    controlling shifting according to the determined driving mode.

14. The method of claim 11, further comprising:
    determining a driving mode according to the congested road if the road is congested; and
    controlling shifting according to the determined driving mode.

15. The method of claim 11, further comprising:
    determining a driving mode according to the short term driving tendency of the driver if the difference between the short term driving tendency and the long term driving tendency of the driver is larger than the predetermined value; and
    controlling shifting according to the determined driving mode.

16. A method of controlling shifting for a vehicle comprising:
    detecting data for a shifting control;
    determining whether a road state is a specific road state based on the data;
    determining, if the road state is not the specific road state, whether a road shape is a specific road shape based on the data;
    determining, if the road shape is not the specific road shape, whether the road is congested based on the data;

calculating, if the road is not congested, a short term driving tendency factor and a long term driving tendency factor of the driver based on the data;
determining a driving mode by considering the short term driving tendency factor and the long term driving tendency factor of the driver; and
controlling shifting according to the determined driving mode.

17. The method of claim 16, further comprising:
determining the driving mode according to the specific road state if the road state is the specific road state; and
controlling shifting according to the determined driving mode.

18. The method of claim 16, further comprising:
determining the driving mode according to the specific road shape if the road shape is the specific road shape; and
controlling shifting according to the determined driving mode.

19. The method of claim 16, further comprising:
determining the driving mode according to the congested road if the road is congested; and
controlling shifting according to the determined driving mode.

* * * * *